US010505461B2

(12) United States Patent
Chang et al.

(10) Patent No.: US 10,505,461 B2
(45) Date of Patent: Dec. 10, 2019

(54) FLYBACK POWER CONVERTER CIRCUIT AND PRIMARY SIDE CONTROLLER CIRCUIT AND METHOD THEREOF

(71) Applicant: RICHTEK TECHNOLOGY CORPORATION, Zhubei, Hsinchu (TW)

(72) Inventors: Kuang-Fu Chang, KaoHsiung (TW); Chien-Hung Chen, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/963,058

(22) Filed: Apr. 25, 2018

(65) Prior Publication Data

US 2018/0323717 A1     Nov. 8, 2018

Related U.S. Application Data

(60) Provisional application No. 62/502,740, filed on May 7, 2017.

(30) Foreign Application Priority Data

Sep. 27, 2017   (TW) .............................. 106133062 A

(51) Int. Cl.
  *H02M 3/335*     (2006.01)
  *H02M 1/32*      (2007.01)
  (Continued)

(52) U.S. Cl.
  CPC ......... *H02M 3/33523* (2013.01); *H02M 1/32* (2013.01); *H02M 1/36* (2013.01);
  (Continued)

(58) Field of Classification Search
  CPC ............ H02M 3/335; H02M 3/33507; H02M 3/33515; H02M 3/33523; H02M 3/33553;
  (Continued)

(56) References Cited

U.S. PATENT DOCUMENTS

| 8,031,493 | B2* | 10/2011 | Huang | H02M 3/33507 |
| | | | | 363/21.18 |
| 9,766,584 | B1* | 9/2017 | Ogishima | G03G 15/80 |
| 2008/0043504 | A1* | 2/2008 | Ye | H02M 3/33507 |
| | | | | 363/97 |
| 2009/0316441 | A1* | 12/2009 | Hu | H02M 3/33592 |
| | | | | 363/21.06 |
| 2011/0022867 | A1* | 1/2011 | Chang | G06F 1/3218 |
| | | | | 713/323 |

(Continued)

*Primary Examiner* — Gustavo A Rosario-Benitez
(74) *Attorney, Agent, or Firm* — Tung & Associates

(57) ABSTRACT

A flyback power converter circuit includes a transformer, a power switch, a primary side controller circuit, and a secondary side controller circuit. The transformer converts an input voltage to a first, a second and a third output voltages. The primary side controller circuit and the secondary side control are powered by the second voltage and a third voltage, respectively. In a burst mode, when the second output voltage is lower than a first threshold, a power regulation mode is triggered to control the power switch, such that the second output voltage is between the first threshold and a second threshold. After a predetermined delay time period, the power regulation mode stops and the flyback power converter circuit enters a reboot procedure, wherein the power switch is OFF such that the third voltage is lower than a secondary side reboot threshold, whereby the secondary side controller circuit is reboot.

21 Claims, 5 Drawing Sheets

(51) Int. Cl.
*H02M 1/36* (2007.01)
*H02M 1/00* (2006.01)

(52) U.S. Cl.
CPC ............... *H02M 3/33515* (2013.01); *H02M 2001/0025* (2013.01); *H02M 2001/0035* (2013.01)

(58) Field of Classification Search
CPC ....... H02M 3/3353; H02M 2001/0006; H02M 2001/0025; H02M 2001/0032; H02M 2001/0035; H02M 1/08; H02M 1/32; H02M 1/36; H02M 3/33592
See application file for complete search history.

(56) References Cited

U.S. PATENT DOCUMENTS

| | | | |
|---|---|---|---|
| 2013/0003421 A1* | 1/2013 | Fang ................. | H02M 3/33523 363/21.01 |
| 2015/0280573 A1* | 10/2015 | Gong ................ | H02M 3/33523 363/21.14 |
| 2015/0288288 A1* | 10/2015 | Chang ............... | H02M 3/33523 363/21.16 |
| 2015/0372603 A1* | 12/2015 | Tang ................. | H02M 3/33523 363/21.15 |
| 2016/0294273 A1* | 10/2016 | Kawamura ....... | H02M 3/33523 |
| 2017/0366089 A1* | 12/2017 | Matsuda ............ | H02M 1/08 |
| 2017/0366091 A1* | 12/2017 | Langeslag ......... | H02M 1/08 |

\* cited by examiner

FLYBACK POWER CONVERTER CIRCUIT AND PRIMARY SIDE CONTROLLER CIRCUIT AND METHOD THEREOF

CROSS REFERENCE

The present invention claims priority to U.S. 62/502,740, filed on May 7, 2017, and TW 106133062, filed on Sep. 27, 2017.

BACKGROUND OF THE INVENTION

Field of Invention

The present invention relates to flyback power converter circuit, particularly to such a flyback power converter circuit capable of operating in a power regulation mode. The present invention also relates to a primary side controller circuit for use in the flyback power converter circuit and a method for controlling the flyback power converter circuit.

Description of Related Art

FIG. 1 shows a prior art flyback power converter circuit (flyback power converter circuit 1). The flyback power converter circuit 1 includes a transformer 10, a power switch N1, a primary side controller circuit 30 and a secondary side controller circuit 20. Please also refer to FIG. 2, wherein FIG. 2 shows waveforms corresponding to the prior art of FIG. 1. When the flyback power converter circuit 1 operates in a burst mode, when the auxiliary output voltage VDD1 (which is provided to the primary side controller circuit 30 as its power supply) is lower than a first voltage threshold VTH1, the primary side controller circuit 30 is triggered to enter into a power regulation mode, to control the level of the auxiliary output voltage VDD1 between the first voltage threshold VTH1 and the second voltage threshold VTH2.

The prior art shown in FIGS. 1 and 2 has a drawback that, when the power regulation mode is running, if the secondary side controller circuit 20 is required to enter into, e.g. a protection mode which needs to reboot the secondary side controller circuit 20, because the power regulation mode dominates the control of the auxiliary output voltage VDD1, the operation of the power switch N1 cannot be stopped by controlling the coupling device 40 to lower the feedback compensation signal COMP. Under such circumstance, the output voltage VDD2 (which is provided to the secondary side controller circuit 20 as its power supply) may stay at the level VHP, as shown in FIG. 2; in this case, the secondary side controller circuit 20 cannot be reboot. The above situation can very likely happen at certain levels of the output voltage VOUT. Therefore, in applications wherein the output voltage VOUT is adjustable (such as VBUS voltage compliant with the USB PD specification), such a problem occurs often.

SUMMARY OF THE INVENTION

From one perspective, the present invention provides a flyback power converter circuit. The flyback power converter circuit comprises: a transformer including a primary winding configured to receive an input voltage at a primary side of the transformer, a secondary winding configured to generate a first output voltage at a secondary side of the transformer, and an auxiliary winding configured to generate a second output voltage; a secondary side controller circuit at the secondary side of the transformer, the secondary side controller circuit being powered by a third output voltage which is related to the first output voltage, and being configured to control a coupling device according to the first output voltage to provide a feedback compensation signal to the primary side of the transformer; a power switch coupled to the primary winding; and a primary side controller circuit at the primary side of the transformer, the primary side controller circuit being powered by the second output voltage, and being configured to generate a switch control signal for controlling the power switch, wherein the coupling device is coupled between the primary side controller circuit and the secondary side controller circuit, the primary side controller circuit including: a voltage sense circuit configured to generate a comparison output signal according to the second output voltage, a first voltage threshold and a second voltage threshold; a logic operation circuit coupled to the voltage sense circuit, and configured to generate the switch control signal; and a timer circuit, coupled to the voltage sense circuit and the logic operation circuit, and configured to generate a timer signal; wherein when the comparison output signal indicates that the second output voltage drops to the first voltage threshold in a burst mode, the logic operation circuit is triggered into a power regulation mode to control the power switch such that the second output voltage is between the first voltage threshold and the second voltage threshold, and the logic operation circuit stops operating in the power regulation mode after a predetermined period of time from entering into the power regulation mode according to the timer signal such that the primary side controller circuit starts a reboot procedure, wherein in the reboot procedure, the power switch is OFF such that the third output voltage is lower than a secondary side reboot threshold to reboot the secondary side controller circuit.

In one embodiment, in the reboot procedure, the power switch is OFF such that the second output voltage drops to a primary side reboot threshold to reboot the primary side controller circuit.

In one embodiment, the primary side controller circuit confirms the burst mode according to the feedback compensation signal and a first voltage threshold.

In one embodiment, in a protection mode, the secondary side controller circuit controls the coupling device to adjust the feedback compensation signal to a predetermined voltage, such that the switch control signal controls the power switch to be OFF, whereby the primary side controller circuit is triggered into the power regulation mode and enters into the reboot procedure.

In one embodiment, in a protection mode, the secondary side controller circuit controls a discharge circuit to discharge the first output voltage such that the third output voltage drops to the secondary side reboot threshold.

In one embodiment, a level of the first output voltage is adjustable.

In one embodiment, the secondary side controller circuit determines the level of the first output voltage according to an adjustment signal.

From another perspective, the present invention provides a primary side controller circuit for us in controlling a flyback power converter circuit. The flyback power converter circuit comprising a transformer including a primary winding configured to receive an input voltage at a primary side of the transformer, a secondary winding configured to generate a first output voltage at a secondary side of the transformer, and an auxiliary winding configured to generate a second output voltage; a secondary side controller circuit at the secondary side of the transformer, the secondary side controller circuit being powered by a third output voltage which is related to the first output voltage, and being configured to control a coupling device according to the first output voltage to provide a feedback compensation signal to the primary side of the transformer; and a power switch coupled to the primary winding; wherein the primary side controller circuit is at the primary side of the transformer, the primary side controller circuit being powered by the second output voltage, and being configured to generate a switch control signal for controlling the power switch, wherein the coupling device is coupled between the primary side controller circuit and the secondary side controller circuit. The primary side controller circuit comprises: a voltage sense circuit configured to generate a comparison output signal according to the second output voltage, a first voltage threshold and a second voltage threshold; a logic operation circuit coupled to the voltage sense circuit, and configured to generate the switch control signal; and a timer circuit, coupled to the voltage sense circuit and the logic operation circuit, and configured to generate a timer signal; wherein when the comparison output signal indicates that the second output voltage drops to the first voltage threshold in a burst mode, the logic operation circuit is triggered into a power regulation mode to control the power switch such that the second output voltage is between the first voltage threshold and the second voltage threshold, and the logic operation circuit stops operating in the power regulation mode after a predetermined period of time from entering into the power regulation mode according to the timer signal such that the primary side controller circuit starts a reboot procedure, wherein in the reboot procedure, the power switch is OFF such that the third output voltage drops to a secondary side reboot threshold to reboot the secondary side controller circuit.

From another perspective, the present invention provides a method for controlling a flyback power converter circuit. The flyback power converter circuit comprising a transformer including a primary winding configured to receive an input voltage at a primary side of the transformer, a secondary winding configured to generate a first output voltage at a secondary side of the transformer, and an auxiliary winding configured to generate a second output voltage; a secondary side controller circuit at the secondary side of the transformer, the secondary side controller circuit being powered by a third output voltage which is related to the first output voltage, and being configured to control a coupling device according to the first output voltage to provide a feedback compensation signal to the primary side of the transformer; and a power switch coupled to the primary winding; wherein the primary side controller circuit is at the primary side of the transformer, the primary side controller circuit being powered by the second output voltage, and being configured to generate a switch control signal for controlling the power switch, wherein the coupling device is coupled between the primary side controller circuit and the secondary side controller circuit. The method comprises: when the comparison output signal indicates that the second output voltage drops to the first voltage threshold in a burst mode, triggering the flyback power converter circuit to enter into a power regulation mode wherein the power switch is controlled such that the second output voltage is between the first voltage threshold and the second voltage threshold; stopping operating in the power regulation mode after a predetermined period of time from entering into the power regulation mode such that the primary side controller circuit starts a reboot procedure; and in the reboot procedure, the power switch is OFF such that the third output voltage drops to a secondary side reboot threshold to reboot the secondary side controller circuit.

In one embodiment, in the reboot procedure, the power switch is OFF such that the second output voltage drops to a primary side reboot threshold to reboot the primary side controller circuit.

In one embodiment, the burst mode is confirmed according to the feedback compensation signal and a first voltage threshold.

In one embodiment, the step of triggering the flyback power converter circuit to enter into a power regulation mode comprises: in a protection mode, controlling the coupling device to adjust the feedback compensation signal to a predetermined voltage, such that the switch control signal controls the power switch to be OFF, whereby the primary side controller circuit is triggered into the power regulation mode and enters into the reboot procedure.

In one embodiment, in a protection mode, the first output voltage is discharged such that the third output voltage drops to the secondary side reboot threshold.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
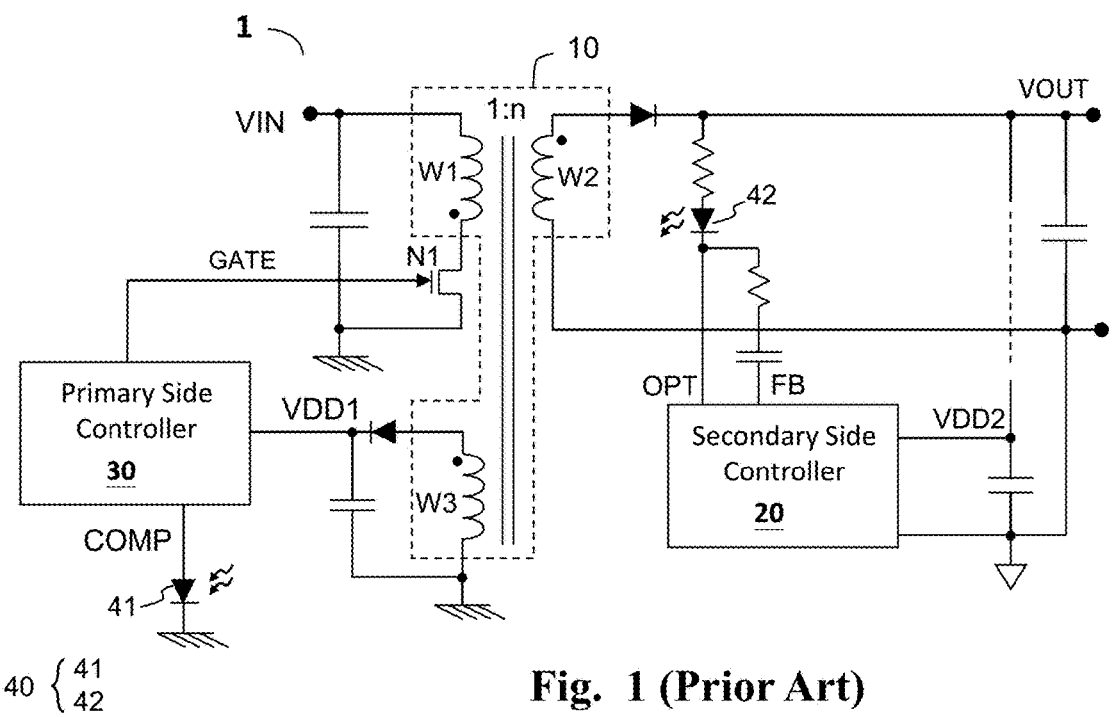
FIG. 1 shows a prior art flyback power converter circuit.
Figure 2:
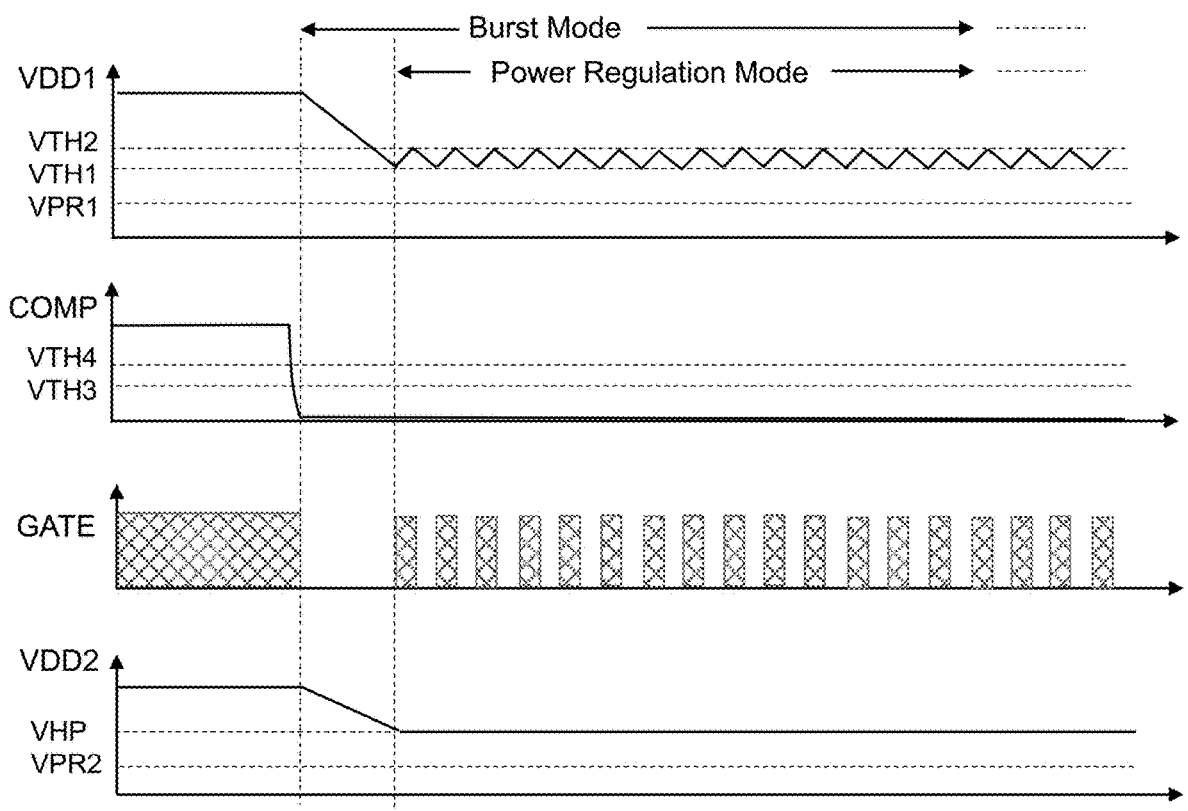
FIG. 2 shows waveforms corresponding to the prior art of FIG. 1.
Figure 3:
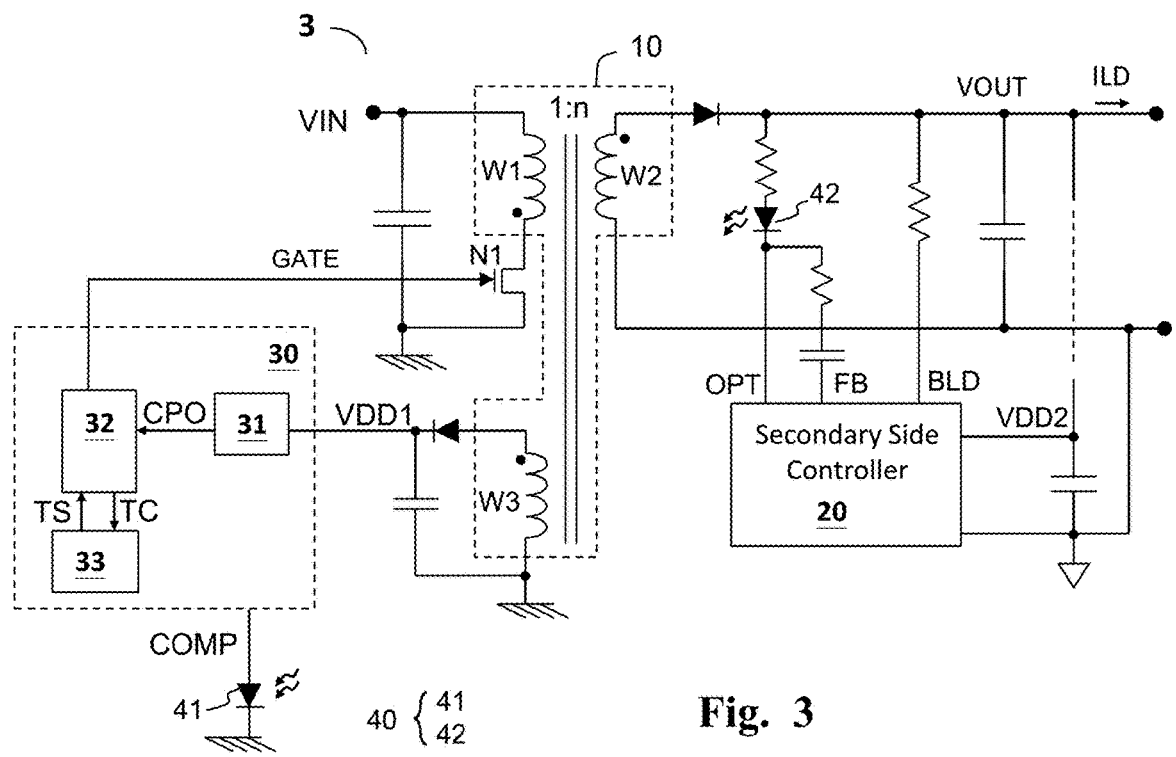
FIG. 3 shows an embodiment of a flyback power converter circuit according to the present invention.

Please refer to FIG. 3, which shows an embodiment of a flyback power converter circuit according to the present invention (flyback power converter circuit 3). The flyback power converter circuit 3 comprises a transformer 10, a power switch N1, a primary side controller circuit 30, and a secondary side controller circuit 20. The transformer 10 includes a primary winding W1, a secondary winding W2, and an auxiliary winding W3, wherein the primary winding W1 is at the primary side of the transformer 10 and receives the input voltage VIN; the secondary winding W2 is at the secondary side of the transformer 10 and generates the first output voltage VOUT; the auxiliary winding W3 generates the second output voltage VDD1. The power switch N1 is coupled to the primary winding W1. The primary side controller circuit 30 is at the primary side of the transformer 10 and is powered by the second output voltage VDD1; the primary side controller circuit 30 is configured to generate a switch control signal GATE for controlling the power switch N1. In one embodiment, the primary side controller circuit 30 generates the switch control signal GATE in for example but not limited to PWM (pulse-width-modulation) form according to the feedback compensation signal COMP, to control the power switch N1. The secondary side controller circuit 20 is at the secondary side of the transformer 10 and is powered by the third output voltage VDD2; the secondary side controller circuit 20 is configured to control a coupling device 40 (which is for example but not limited to an opto-coupler device, including a first part 41 and a second part 42) according to the first output voltage VOUT, to generate the feedback compensation signal COMP at the primary side. The coupling device 40 is coupled between the primary side controller circuit 30 (via the first part 41) and the secondary side controller circuit 20 (via the second part 42). The third output voltage VDD2 is related to the first output voltage VOUT; in one embodiment, the third output voltage VDD2 is directly connected to the first output voltage VOUT, and in other embodiments, the third output voltage VDD2 for example can be a divided voltage, a filtered voltage, or a regulated voltage obtained from the first output voltage VOUT. In one embodiment, the second part 42 is coupled to receive a feedback signal FB, and the feedback signal FB is converted to the feedback compensation signal COMP through the first part 41. The feedback signal FB is related to the first output voltage VOUT; for example, the feedback signal FB can be the first output voltage VOUT itself or a divided voltage thereof. By the feedback loop, the first output voltage VOUT is regulated to a target voltage. Note that the way to obtain the feedback signal FB shown in the figure is only a non-limiting example.

Figure 4:
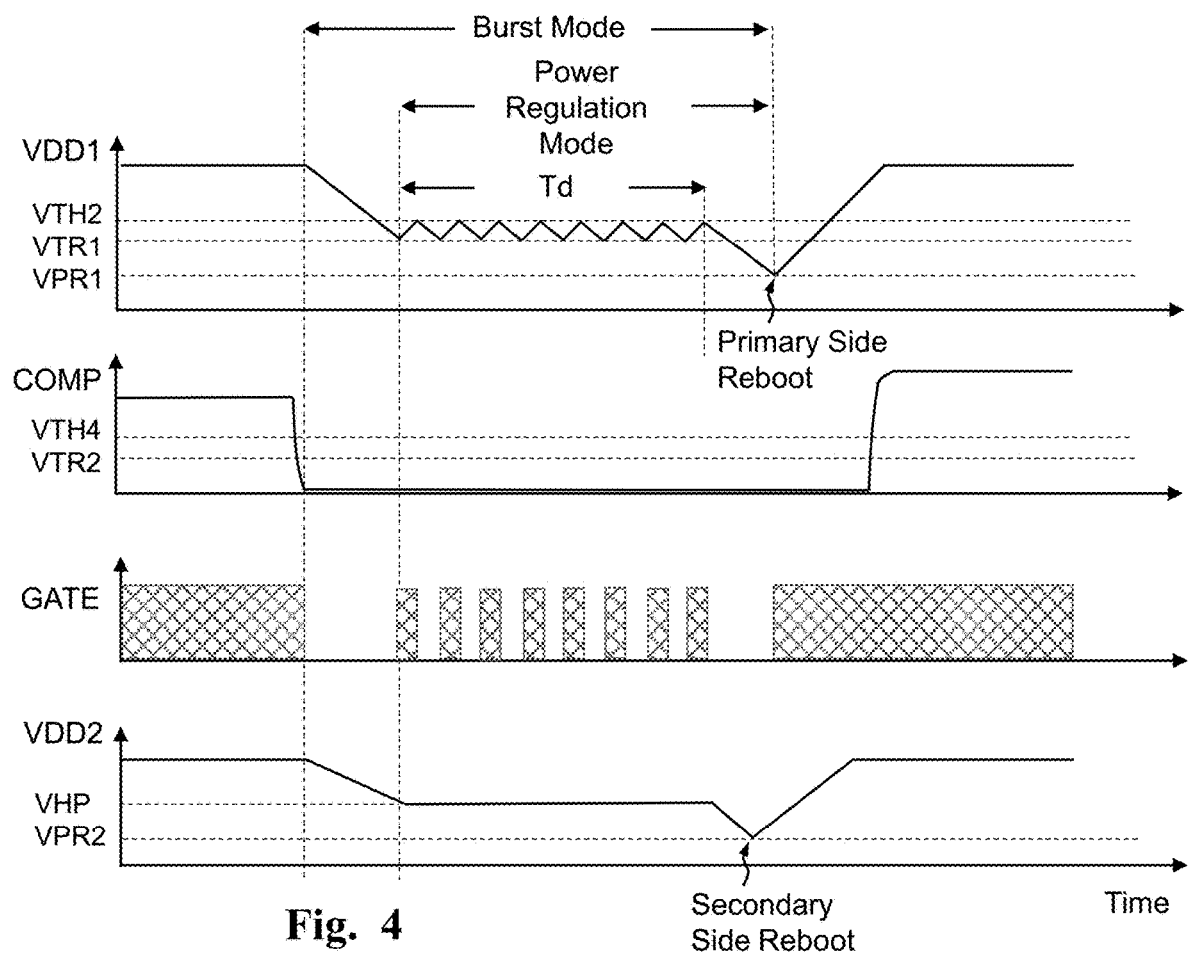
FIG. 4 shows waveforms corresponding to the embodiment of FIG. 3.

Still referring to FIG. 3, in one embodiment, the primary side controller circuit 30 includes a voltage sense circuit 31, a logic operation circuit 32 and a timer circuit 33. The voltage sense circuit 31 is configured to generate a comparison output signal CPO according to the second output voltage VDD1, a first voltage threshold VTH1 and a second voltage threshold VTH2; the logic operation circuit 32 is coupled to the voltage sense circuit 31, and is configured to generate the switch control signal GATE; the timer circuit 33 is coupled to the voltage sense circuit 31 and the logic operation circuit 32, and is configured to generate a timer signal TS. Please also refer to FIG. 4, which shows waveforms corresponding to the embodiment of FIG. 3. When the comparison output signal CPO indicates that the second output voltage VDD1 drops to a trigger voltage threshold VTR1 in a burst mode, the logic operation circuit 32 is triggered to enter into a power regulation mode to control the power switch N1 such that the second output voltage VDD1 is between the first voltage threshold VTH1 and the second voltage threshold VTH2. In one embodiment, the trigger voltage threshold VTR1 has the same voltage level as either the first voltage threshold VTH1 or the second voltage threshold VTH2, wherein the first voltage threshold VTH1 is smaller the second voltage threshold VTH2. In the present embodiment, the trigger voltage threshold VTR1 has the same voltage level as the first voltage threshold VTH1. The logic operation circuit 32 stops operating in the power regulation mode after a predetermined period of time (e.g. Td as shown in FIG. 4) from entering into the power regulation mode according to the timer signal TS such that the primary side controller circuit 30 starts a reboot procedure. In one embodiment, the predetermined period of time Td is a predetermined constant, while in another embodiment, the predetermined period of time Td is a variable dependent on another factor, such as dependent on the duration of the switch control signal GATE.

Still referring to FIGS. 3 and 4, in the reboot procedure, the power switch N1 is OFF such that the second output voltage VDD1 drops to a primary side reboot threshold VPR1 to reboot the primary side controller circuit 30. Because the primary side controller circuit 30 stops operating in the power regulation mode, the second output voltage VDD1 is lowered, and the third output voltage VDD2 is also lowered; the third output voltage VDD2 becomes lower than a secondary side reboot threshold VPR2, whereby the secondary side controller circuit 20 is reboot. It should be noted that the timing of rebooting the secondary side can be the same, earlier, or later than the timing of rebooting the primary side.

The "burst mode" refers to a situation wherein, for example because the load requires very little current, or because the feedback compensation signal COMP is so adjusted that, the power switch N1 keeps OFF in a relatively long period of time, such as over several PWM cycles. Because the power supply of the primary side controller circuit 30 (i.e. the second output voltage VDD1) is subject to the operation of the power switch N1, in the burst mode, the duration in which the power switch N1 is OFF could be so long that the second output voltage VDD1 drops to the trigger voltage threshold VTR1 and triggers the flyback power converter circuit to enter into the power regulation mode.

Figure 5:
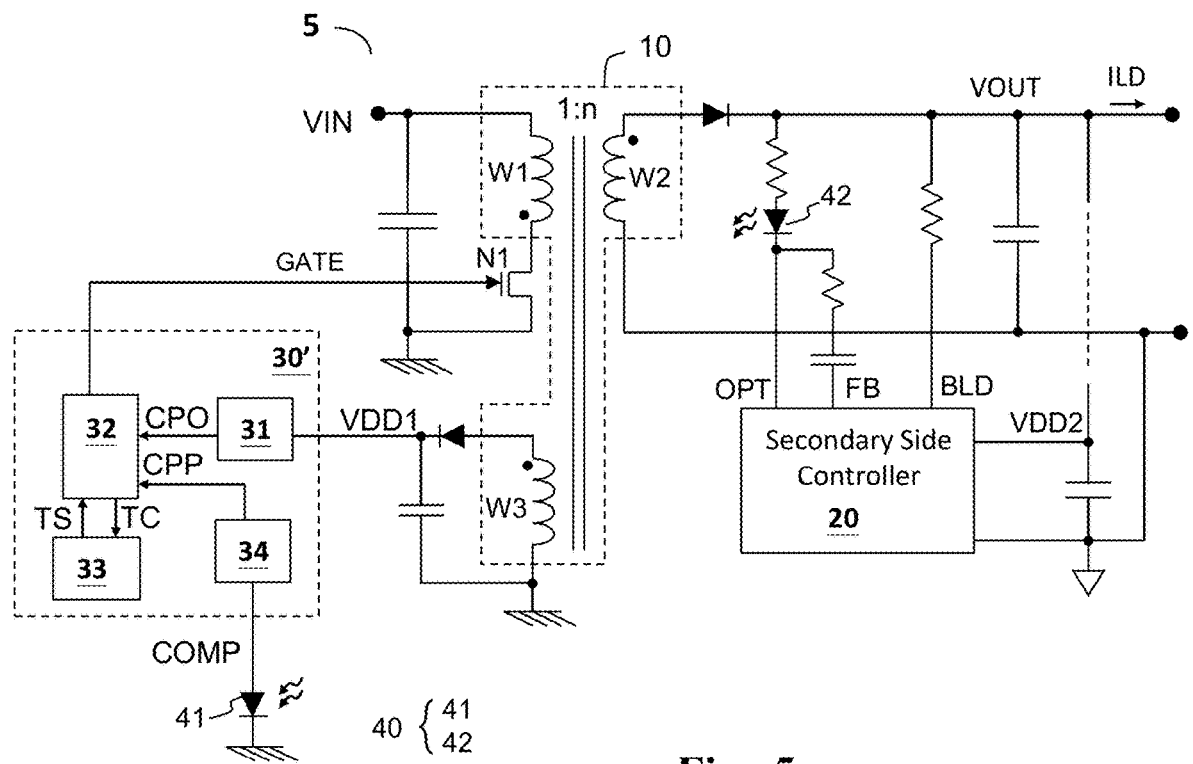
FIG. 5 shows an embodiment of a flyback power converter circuit according to the present invention.

In one embodiment, the primary side controller circuit 30 can generate a comparison output signal CPP to confirm the burst mode according to the feedback compensation signal COMP and a burst mode threshold VTR2. FIG. 5 shows an embodiment of a flyback power converter circuit according to the present invention (flyback power converter circuit 5). The flyback power converter circuit 5 is similar to the flyback power converter circuit 3 but is different in that the primary side controller circuit 30' of the flyback power converter circuit 5 further comprises a burst mode confirmation circuit 34, which is coupled to the logic operation circuit 32 and is electrically connected with the feedback compensation signal COMP; when the comparison output signal CPP indicates that the feedback compensation signal COMP drops to the burst mode threshold VTR2, the logic operation circuit 32 is triggered to enter into the burst mode. Please also refer to FIG. 4, in one embodiment, in a protection mode, the secondary side controller circuit 20 controls the coupling device 40 to adjust the feedback compensation signal COMP to a predetermined voltage, so as to trigger the burst mode wherein the power switch N1 keeps OFF, and this will eventually trigger the primary side controller circuit 30 to enter into the power regulation mode; after a predetermined period of time Td, the reboot procedure starts. In one embodiment, the coupling device 40 can be controlled so that the feedback compensation signal COMP is adjusted to an extreme value (for example, in the embodiment of FIG. 4, adjusted to ground level, or in another embodiment, adjusted to a power supply level such as VDD1), to achieve the above operation (i.e., to trigger the burst mode for a while so as to trigger the power regulation mode and the reboot procedure, such that the secondary side controller circuit 20 is reboot).

Figure 7:
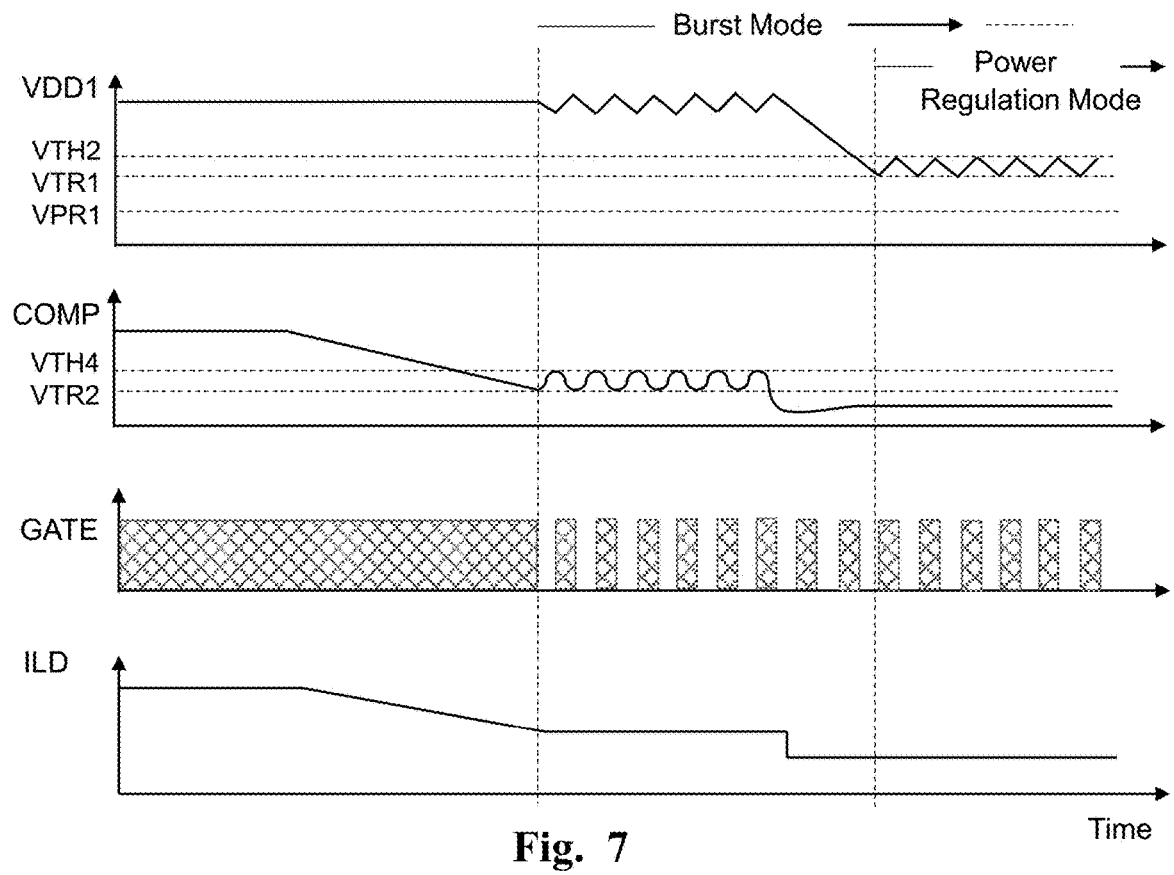
FIG. 7 shows waveforms corresponding to the embodiment of FIG. 5.

Referring to FIG. 7, which shows waveforms corresponding to the embodiment of FIG. 5, in this embodiment, when the load current ILD (the current that is consumed by the load which receives the first output voltage VOUT) decreases, the feedback compensation signal COMP correspondingly decreases, and when the feedback compensation signal COMP drops to the burst mode threshold VTR2, the burst mode is triggered (as shown by "Burst Mode" in FIG. 7); in the burst mode, the power switch N1 is controlled (for example by enabling/disabling the switch control signal GATE) such that the level of the feedback compensation signal COMP is between a third voltage threshold VTH3 and a fourth voltage threshold VTH4. In one embodiment, the third voltage threshold VTH3 has the same voltage level as the burst mode threshold VTR2. In this embodiment, it is shown that when the load current ILD further decreases, the power switch N1 may keep OFF for a period of time that is so long to cause the second output voltage VDD1 to drop to the trigger voltage threshold VTR1, and trigger the power regulation mode (as shown by "Power Regulation Mode" in FIG. 7).

Figure 6:
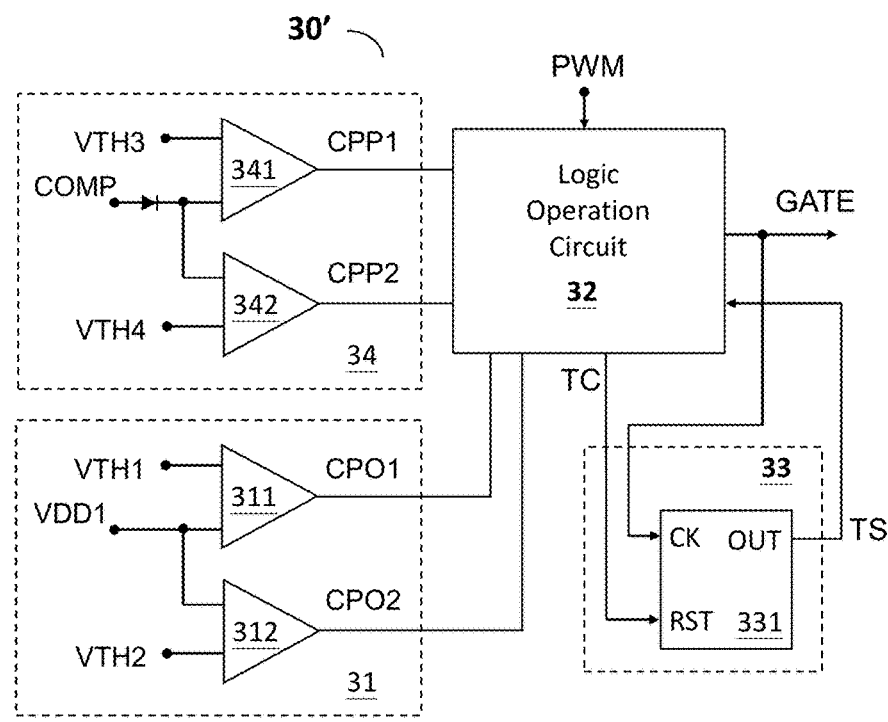
FIG. 6 shows an embodiment of a primary side controller circuit of a flyback power converter circuit according to the present invention.

Please refer to FIG. 6, which shows an embodiment of a primary side controller circuit according to the present invention (primary side controller circuit 30'). In one embodiment, the burst mode confirmation circuit 34 includes comparison circuits 341 and 342, for comparing the feedback compensation signal COMP with the third voltage threshold VTH3 and the fourth voltage threshold VTH4 respectively, to generate the comparison output signal CPP (including the signals CPP1 and CPP2 shown in the figure). In one embodiment, the third voltage threshold VTH3 has the same voltage level as the burst mode threshold VTR2. Please also refer to FIG. 7, which shows waveforms corresponding to the embodiment of FIG. 6, in one embodiment, in the burst mode, the primary side controller circuit 30' controls the power switch N1 such that the level of the feedback compensation signal COMP is between the third voltage threshold VTH3 and the fourth voltage threshold VTH4.

Still referring to FIG. 6, in one embodiment, the voltage sense circuit 31 includes comparison circuits 311 and 312, for comparing the second output voltage VDD1 with the first voltage threshold VTH1 and the second voltage threshold VTH2 respectively, to generate the comparison output signal CPO (including the signals CPO1 and CPO2 shown in the figure). In one embodiment, the timer circuit 33 includes a counter 331 as shown in the figure, for counting the period of time Td according to the switch control signal GATE and a timer control signal TC to generate the timer signal TS. In another embodiment, the counter 331 can count according to a signal other than the switch control signal GATE.

Figure 8:
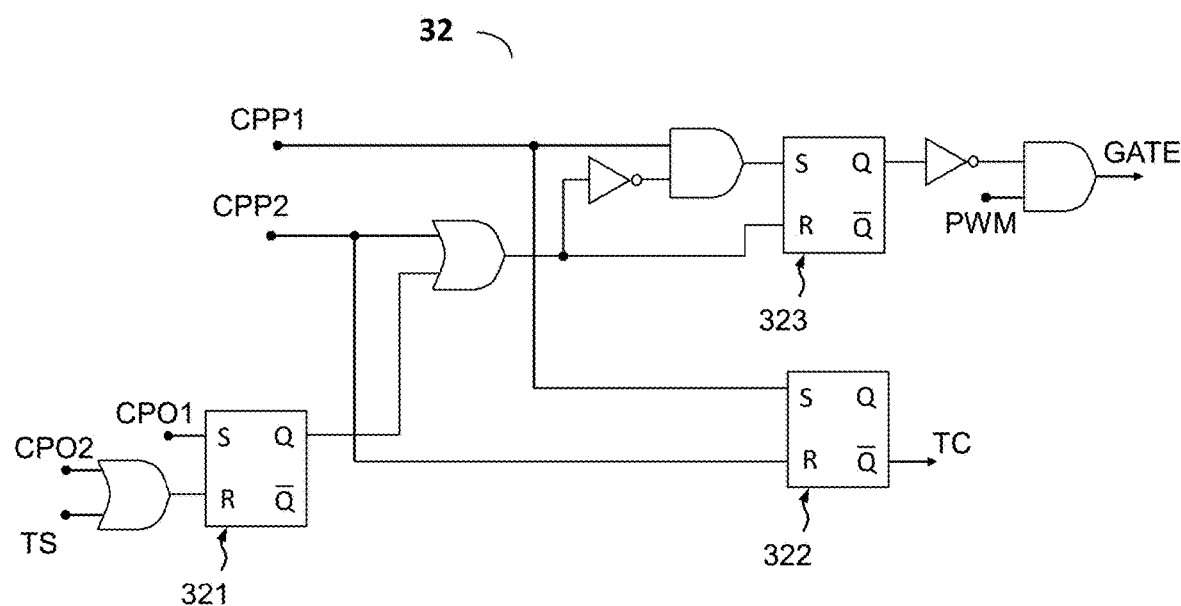
FIG. 8 shows an embodiment of a logic operation circuit of a flyback power converter circuit according to the present invention.

Please refer to FIG. 8, which shows an embodiment of a logic operation circuit according to the present invention (logic operation circuit 32). In one embodiment, the logic operation circuit 32 includes at least one state control circuit (such as the latches 321, 322 and 323 shown in the figure) and a logic gate (such as the logic gate shown in the figure), for generating the switch control signal GATE and the timer control signal TC according to the comparison output signals CPO1, CPO2, CPP1 and CPP2, the modulation signal PWM, and the timer signal TS. In one embodiment, the modulation signal PWM is generated according to the feedback compensation signal COMP.

Figure 9:
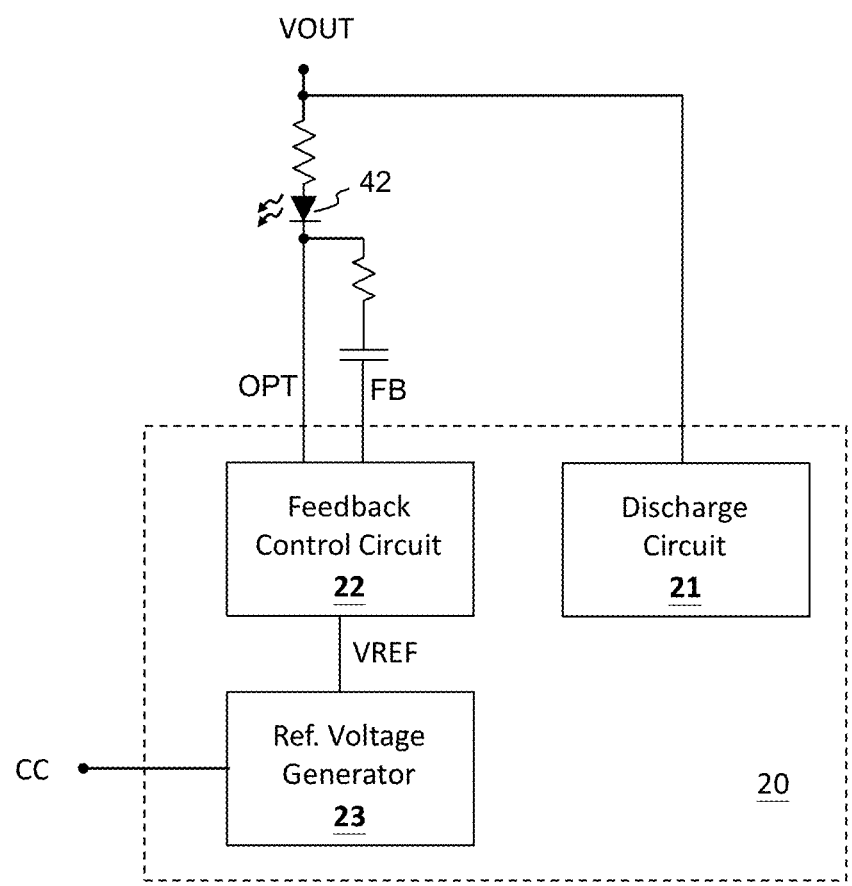
FIG. 9 shows an embodiment of a secondary side controller circuit of a flyback power converter circuit according to the present invention.

Please refer to FIG. 9, which shows an embodiment of a secondary side controller circuit according to the present invention (secondary side controller circuit 20). In one embodiment, the secondary side controller circuit 20 controls a discharge circuit 21 to discharge the first output voltage VOUT, such that the third output voltage VDD2 drops to a secondary side reboot threshold, to reboot the secondary side controller circuit 20. The discharge circuit 21 can be located inside or outside the secondary side controller circuit 20. In one embodiment as shown in the figure, the secondary side controller circuit includes the discharge circuit 21 inside. The timing for the discharge circuit 21 to discharge the first output voltage VOUT for example can be within a protection mode. In other embodiments, the discharge operation can be triggered by other ways, such as by the primary side controller circuit 30.

In the flyback power converter circuit according to the present invention, the first output voltage VOUT can be a constant or adjustable. Still referring to FIG. 9, in one embodiment, the secondary side controller circuit 20 includes a feedback control circuit 22, for controlling the coupling device 40 (e.g., its second part 42) so as to control the feedback compensation signal COMP at the primary side. In one embodiment, the secondary side controller circuit 20 includes a reference voltage generator 23 for generating a reference voltage REF, wherein the feedback control circuit 22 controls the feedback compensation signal COMP according to the reference voltage REF, such that the first output voltage VOUT correlates to the reference voltage REF (e.g., such that the first output voltage VOUT is equal to the reference voltage REF or a multiple of the reference voltage REF). In one embodiment, the reference voltage REF is adjustable, whereby the first output voltage VOUT is adjustable. In one embodiment, the reference voltage generator 23 determines the level of the first output voltage VOUT according to an adjustment signal CC (which for example includes the configuration channel signals CC1 and CC2 incompliance with USB type C or USB PD specifications).

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. As an example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:
1. A flyback power converter circuit, comprising:
a transformer including a primary winding configured to receive an input voltage at a primary side of the transformer, a secondary winding configured to generate a first output voltage at a secondary side of the transformer, and an auxiliary winding configured to generate a second output voltage;
a secondary side controller circuit at the secondary side of the transformer, the secondary side controller circuit being powered by a third output voltage which is related to the first output voltage, and being configured to control an opto-coupling device according to the first output voltage to provide a feedback compensation signal to the primary side of the transformer;
a power switch coupled to the primary winding; and
a primary side controller circuit at the primary side of the transformer, the primary side controller circuit being powered by the second output voltage, and being configured to generate a switch control signal for controlling the power switch, wherein the opto-coupling device is coupled between the primary side controller circuit and the secondary side controller circuit, the primary side controller circuit including:
  a voltage sense circuit configured to generate a comparison output signal according to the second output voltage, a first voltage threshold and a second voltage threshold;
  a logic operation circuit coupled to the voltage sense circuit, and configured to generate the switch control signal; and
  a timer circuit, coupled to the voltage sense circuit and the logic operation circuit, and configured to generate a timer signal;
  wherein when the comparison output signal indicates that the second output voltage drops to the first voltage threshold in a burst mode, the logic operation circuit is triggered into a power regulation mode to control the power switch such that the second output voltage is between the first voltage threshold and the second voltage threshold, and the logic operation circuit stops operating in the power regulation mode after a predetermined period of time from entering into the power regulation mode according to the timer signal such that the primary side controller circuit starts a reboot procedure, wherein in the reboot procedure, the power switch is completely OFF such that the third output voltage drops to a secondary side reboot threshold to reboot the secondary side controller circuit.

2. The flyback power converter circuit of claim 1, wherein in the reboot procedure, the power switch is OFF such that the second output voltage drops to a primary side reboot threshold to reboot the primary side controller circuit.

3. The flyback power converter circuit of claim 1, wherein the primary side controller circuit confirms the burst mode according to the feedback compensation signal and the first voltage threshold.

4. The flyback power converter circuit of claim 1, wherein in a protection mode, the secondary side controller circuit controls the opto-coupling device to adjust the feedback compensation signal to a predetermined voltage, such that the switch control signal controls the power switch to be OFF, whereby the primary side controller circuit is triggered into the power regulation mode and enters into the reboot procedure.

5. The flyback power converter circuit of claim 1, wherein in a protection mode, the secondary side controller circuit controls a discharge circuit to discharge the first output voltage such that the third output voltage drops to the secondary side reboot threshold.

6. The flyback power converter circuit of claim 1, wherein a level of the first output voltage is adjustable.

7. The flyback power converter circuit of claim 6, wherein the secondary side controller circuit determines the level of the first output voltage according to an adjustment signal.

8. A primary side controller circuit for us in controlling a flyback power converter circuit, the flyback power converter circuit comprising a transformer including a primary winding configured to receive an input voltage at a primary side of the transformer, a secondary winding configured to generate a first output voltage at a secondary side of the transformer, and an auxiliary winding configured to generate a second output voltage; a secondary side controller circuit at the secondary side of the transformer, the secondary side controller circuit being powered by a third output voltage which is related to the first output voltage, and being configured to control an opto-coupling device according to the first output voltage to provide a feedback compensation signal to the primary side of the transformer; and a power switch coupled to the primary winding; wherein the primary side controller circuit is at the primary side of the transformer, the primary side controller circuit being powered by the second output voltage, and being configured to generate a switch control signal for controlling the power switch, wherein the opto-coupling device is coupled between the primary side controller circuit and the secondary side controller circuit, the primary side controller circuit comprising:
  a voltage sense circuit configured to generate a comparison output signal according to the second output voltage, a first voltage threshold and a second voltage threshold;
  a logic operation circuit coupled to the voltage sense circuit, and configured to generate the switch control signal; and
  a timer circuit, coupled to the voltage sense circuit and the logic operation circuit, and configured to generate a timer signal;
  wherein when the comparison output signal indicates that the second output voltage drops to the first voltage threshold in a burst mode, the logic operation circuit is triggered into a power regulation mode to control the power switch such that the second output voltage is between the first voltage threshold and the second voltage threshold, and the logic operation circuit stops operating in the power regulation mode after a predetermined period of time from entering into the power regulation mode according to the timer signal such that the primary side controller circuit starts a reboot procedure, wherein in the reboot procedure, the power switch is completely OFF such that the third output voltage drops to a secondary side reboot threshold to reboot the secondary side controller circuit.

9. The flyback power converter circuit of claim 8, wherein in the reboot procedure, the power switch is OFF such that the second output voltage drops to a primary side reboot threshold to reboot the primary side controller circuit.

10. The primary side controller circuit of claim 8, wherein the primary side controller circuit confirms the burst mode according to the feedback compensation signal and the first voltage threshold.

11. The primary side controller circuit of claim 8, wherein in a protection mode, the secondary side controller circuit controls the opto-coupling device to adjust the feedback compensation signal to a predetermined voltage, such that the switch control signal controls the power switch to be OFF, whereby the primary side controller circuit is triggered into the power regulation mode and enters into the reboot procedure.

12. The primary side controller circuit of claim 8, wherein in a protection mode, the secondary side controller circuit controls a discharge circuit to discharge the first output voltage such that the third output voltage drops to the secondary side reboot threshold.

13. The primary side controller circuit of claim 8, wherein a level of the first output voltage is adjustable.

14. The primary side controller circuit of claim 13, wherein the secondary side controller circuit determines the level of the first output voltage according to an adjustment signal.

15. A method for controlling a flyback power converter circuit, the flyback power converter circuit comprising a transformer including a primary winding configured to receive an input voltage at a primary side of the transformer, a secondary winding configured to generate a first output voltage at a secondary side of the transformer, and an auxiliary winding configured to generate a second output voltage; a secondary side controller circuit at the secondary side of the transformer, the secondary side controller circuit being powered by a third output voltage which is related to the first output voltage, and being configured to control an opto-coupling device according to the first output voltage to provide a feedback compensation signal to the primary side of the transformer; and a power switch coupled to the primary winding; wherein the primary side controller circuit is at the primary side of the transformer, the primary side controller circuit being powered by the second output voltage, and being configured to generate a switch control signal for controlling the power switch, wherein the opto-coupling device is coupled between the primary side controller circuit and the secondary side controller circuit, the method comprising:

when the comparison output signal indicates that the second output voltage drops to the first voltage threshold in a burst mode, triggering the flyback power converter circuit to enter into a power regulation mode wherein the power switch is controlled such that the second output voltage is between the first voltage threshold and the second voltage threshold;

stopping operating in the power regulation mode after a predetermined period of time from entering into the power regulation mode such that the primary side controller circuit starts a reboot procedure; and in the reboot procedure, the power switch is completely OFF such that the third output voltage drops to a secondary side reboot threshold to reboot the secondary side controller circuit.

16. The method of claim 15, wherein in the reboot procedure, the power switch is OFF such that the second output voltage drops to a primary side reboot threshold to reboot the primary side controller circuit.

17. The method of claim 15, further comprising: confirming the burst mode according to the feedback compensation signal and the first voltage threshold.

18. The method of claim 15, wherein the step of triggering the flyback power converter circuit to enter into a power regulation mode comprises: in a protection mode, controlling the opto-coupling device to adjust the feedback compensation signal to a predetermined voltage, such that the switch control signal controls the power switch to be OFF, whereby the primary side controller circuit is triggered into the power regulation mode and enters into the reboot procedure.

19. The method of claim 15, further comprising: in a protection mode, discharging the first output voltage such that the third output voltage drops to the secondary side reboot threshold.

20. The method of claim 15, wherein a level of the first output voltage is adjustable.

21. The method of claim 20, wherein the level of the first output voltage is determined according to an adjustment signal.

* * * * *